United States Patent
Niwa et al.

[15] 3,669,844
[45] June 13, 1972

[54] METHOD OF PRODUCING PROTEASE BY MICROORGANISM

[72] Inventors: Kunimori Niwa, 2-160, Kannon, Kawasaki-shi; Hiroshiro Shibai, 10-2-204, Tsujido-danchi, Fujisawa-shi; Masahiro Yasunaga, 5, Zenbu-cho, Hodogaya-ku, Yokohama-shi; Yoshio Hirose, 1155, Nakamaruko, Kawasaki-shi; Teruo Shiro, 2-2-28, Matsunami, Chigasaki-shi, all of Kanagawa-ken, Japan

[22] Filed: Sept. 23, 1970

[21] Appl. No.: 74,831

[30] Foreign Application Priority Data

Oct. 3, 1969 Japan....................................44/79033

[52] U.S. Cl. ..........................................................195/66 R
[51] Int. Cl. .........................................................C12d 13/10
[58] Field of Search.....195/65, 30, 66, 62, 114, 117, 195/118

[56] References Cited

UNITED STATES PATENTS 3,411,990  11/1968  Udagawa et al..........................195/30 X
3,616,234  10/1971  Komagata et al. ......................195/66 R

*Primary Examiner*—Lionel M. Shapiro
*Attorney*—Kelman and Berman

[57] ABSTRACT

Certain microorganisms of Bacillus, Candida and Rhodotorula produce protease when cultured on a medium containing an organic acid as the predominant source of carbon.

5 Claims, No Drawings

METHOD OF PRODUCING PROTEASE BY MICROORGANISM

The present invention relates to a method of producing protease by means of microorganisms.

It is well known that protease is produced by microorganisms cultured on a medium containing as the carbon source, such carbohydrates as starch, glucose or starch hydrolyzate.

It has now been found that a microorganism of genus Bacillus Candida and Rhodotorula when cultured on a medium containing an organic acid as the sole or principal carbon source, can produce protease in very high yield.

Microoragnisms capable of growing on culture media which contain an organic acid as the sole or principal carbon source and capable of producing protease include *Bacillus subtilis* AJ-3168FERM P-242), *Bacillus sp* AJ-3208(NRRL B-3700), *Bacillus sp* AJ-3205 (NRRL B-3699), *Candida lipolytica* AJ-4555(ATCC 16617), *Candida lipolytica* ATCC 16618 and *Rhodotorula glutinis* AJ-5193(NRRL Y-7220). The strains identified by accession number of public culture collections are publicly available from the depositories.

The organic acids which are present in the culture medium of the invention are acetic acid, fumaric acid, maleic acid, malic acid, succinic acid, citric acid, α-ketoglutaric acid, lactic acid or gluconic acid. The organic acid may be present in the culture medium in an amount of 1 to 10 g/dl, and may be present in the beginning of the fermentation period or it may be added gradually with or without a carbohydrate, while the fermentation proceeds. The pH of the culture medium rises as the fermentation proceeds, and the pH can be adjusted by adding the free organic acid.

The following Table 1 shows that acetic acid when used as the carbon source and for pH adjustment does not inactivate the protease produced. A culture medium containing the carbon source indicated in Table 1, 1 g/dn soybean powder, 1.5 g/dl casein, 0.05 g/dl $KH_2PO_4$ and 0.2 g/dl $CaCl_2·7H_2O$, of pH 7.0 was inoculated with one liter seed culture of *Bacillus subtilis* AJ-3168(FERM P-242) which had previously been prepared in a medium having the same composition as that of test run No. 1 at 34° C. for 12 hours, and was cultured at 34° C. for 64 hours with aerating and with stirring. In the test run No. 3, acetic acid was added to maintain the pH of the medium at 6.5 after 8 hours from the inoculation.

Protease activity was determined by a modification of Anthon-Hagiwara's method, in which a borate buffer solution at pH 9.5 was used at 37° C. for 10 minutes.

TABLE 1

| Test run No. | Carbon source (g/dl) | pH Initial | pH During cultivation | Protease produced (unit/ml) Maximum | Protease produced (unit/ml) After 64 hours |
|---|---|---|---|---|---|
| 1 | Starch 3 | 7.0 | 6.3–7.5 | 1200 | 750 |
| 2 | Starch 8 | 7.0 | 6.3–7.5 | 4200 | 3800 |
| 3 | Starch 3 + acetic acid 5 | 7.0 | *6.5 | 4800 | 4800 |
| 4 | Starch 3 | 7.0 | **6.5 | 2400 | 2000 |
| 5 | Starch 8 | 7.0 | **6.5 | 4500 | 4000 |

*pH was adjusted by adding acetic acid.
**pH was adjusted with sulfuric acid.
In test run Nos. 1 and 2, pH was not adjusted.

The culture medium should contain a source of assimilable nitrogen, inorganic salts and the usual organic nutrients. Suitable sources of nitrogen include soybean cake, soybean powder, soybean extracts, milk casein, milk whey, polypeptone, meat extracts and amino acid mixtures, as well as ammonium salts of mineral acids. The usual organic nutrients are corn steep liquor, peptone, yeast extracts and malt extracts.

In the known processes in which starch is used as the carbon source, a starch concentration of 7 to 10 g/dl can not be used, because the medium is too viscous to be stirred for introducing air. According to the present invention, a large amount of organic acid can be used and therefore a large amount of protease is produced.

The protease can be recovered from the culture broth by conventional methods. For example, bacterial cells are removed from the culture broth by filtration or by centrifuging, the protease is precipitated by salting out or by a non-solvent, and is isolated by filtration of centrifuging.

EXAMPLE 1

A culture medium of pH 7.0 containing 1.5 g/dl casein, 2.0 g/dl "Ajipro" (trade name of water-soluble soy protein), 0.25 g/dl $KH_2PO_4$, 0.02 g/dl $MgSO_4·7H_2O$, 0.2 g/dl $CaCl_2·2H_2O$ and 2 ml/ml "Aji-Eki" (trade name of soybean protein hydrolyzate) was prepared, 30 liters of the medium was placed in a jarfermentor, and sterilized at 120° C. for 30 minutes. The medium was adjusted to Ph 6.7 with NaOH solution, inoculated with a strain of bacteria as indicated in Table 2, and cultured at 34° C. for 64 hours with aerating and stirring.

During the cultivation, the pH of the medium was maintained at 6.7 by adding 50 percent acetic acid solution. Protease was produced in the culture broth as listed in Table 2.

TABLE 2

| Strain used | Acetic acid used (g/dl) | Protease produced (unit/ml) |
|---|---|---|
| Bacillus subtilis FERM P-242 | 7.2 | 5900 |
| Bacillus sp NRRL B-3699 | 9.8 | 7600 |
| Bacillus sp NRRL B-3700 | 15.3 | 10300 |

20 liters culture broth of *Bacillus sp* NRRL B-3700 was filtered to remove bacterial cells, the filtrate was concentrated at 40° C. to one-third of the initial volume, and 180 g anhydrous sodium sulfate was dissolved in the concentrated solution. 5 liters isopropanol was added to co-precipitate protease with sodium sulfate at 5° C. The co-precipitate of protease with sodium sulfate was isolated by filtration, dried in vacuo, and contained 57,200 units/g in an amount of 180 g (isolation yield: 50 percent).

EXAMPLE 2

A culture medium containing 3 g/dl starch, 1 g/dl soybean powder, 1.5 g/dl casein, 0.05 g/dl $KH_2PO_4$ and 0.2 g/dl $CaCl_2·7 H_2O$ was prepared, the pH of the medium was adjusted to 7.2 with NaOH, and the medium was sterilized. The pH of the medium was adjusted to 7.0, 20 liters of the medium was inoculated with *Bacillus sp* AJ-3208 (NRRL B-3700), and cultured at 34° C. for 64 hours with aerating and stirring. The pH of the medium was held below 6.1 by adding 30 percent malic acid solution during the cultivation. The amount of malic acid consumed was 4 g per 100 milliliters medium.

The culture broth was found to contain 4,500 units of protease per milliliters.

EXAMPLE 3

A culture medium having the same composition as that of Example 2 was inoculated with *Bacillus subtilis* FERM P-242, and cultured for 64 hours. During the cultivation, gaseous ammonia was introduced to hold the pH of the medium to a minimum of 6.5, and 50 percent acetic acid solution was added to hold the pH to not more than 7.0. Acetic acid was used in an amount of 5 g/dl. The culture broth obtained was found to contain 5,200 units/ml of protease.

EXAMPLE 4

Organic acid anions in the form of the potassium salts listed in Table 3 were added to culture media having the same composition as in Example 2, and each medium was inoculated with *Bacillus subtilis* AJ-3168 (FERM P-242), and cultured at 34° C. for 64 hours with aerating and with stirring. The results obtained are listed in Table 3.

TABLE 3

| Organic acid | Culture period (hour) | Final pH | Protease produced (units/ml) |
|---|---|---|---|
| Potassium acetate | 64 | 8.5 | 3200 |
| Potassium fumarate | 64 | 8.3 | 2800 |
| Potassium maleate | 64 | 8.3 | 2800 |
| None | 48 | 7.5 | 1200 |

EXAMPLE 5

A culture medium of pH 7.0 containing 1.0 g/dl casein, 1.0 g/dl "Ajipro", 0.25 g/dl $KH_2PO_4$, 0.02 g/dl $MgSO_4·7H_2O$, 0.2 g/dl $CaCl_2·2H_2O$ and 2 ml/dl "Aji-Eki", was prepared and, 30 liters of the medium was inoculated with *Candida lipolytica* AJ-4555(ATCC 16617), and cultured at 25° C. for 64 hours with aerating and stirring. During the cultivation, the pH of the medium was maintained at 7.0 by adding 50 percent acetic acid solution. Acetic acid was used in an amount of 4.3 g/dl. The culture broth was found to contain 350 units/ml of weakly alkaline protease at pH 8.5.

EXAMPLE 6

A culture medium having the same composition as that of Example 5 was prepared, the pH of the medium was adjusted to 3.0, and *Rhodotorula glutinis* AJ-5193(NRRL Y-7220) was cultured on the medium in the same way as in Example 5. The pH of the medium was maintained at 3.0 by adding 50 percent acetic acid solution. Acetic acid was used in an amount of 4.8 g/dl after 64 hours.

The acid protease activity was determined in a lactic acid buffer solution of pH 3.0, at 37° C. for 10 minutes, and the culture broth was found to contain 850 units/ml of acid protease.

What we claim is:

1. A method of producing protease which comprises culturing a microorganim of genus Bacillus, Candida or Rhodotorula on an aqueous culture medium including an organic acid as the principal source of assimilable carbon, a source of assimilable nitrogen, necessary inorganic salts, and organic nutrients under aerobic conditions, and recovering the protease produced.

2. A method as set forth in claim 1, wherein said organic acid is acetic acid, malic acid, fumaric acid, maleic acid, succinic acid, citric acid, α-ketoglutaric acid, lactic acid or gluconic acid.

3. A method as set forth in claim 1, wherein said organic acid is acetic acid.

4. A method as set forth in claim 2, said bacterium is *Bacillus subtilis*, *Candida lipolytica* or *Rhodotorula glutinis*.

5. A method as set forth in claim 1, wherein said bacterium is *Bacillus subtilis* FERM P-242, *Bacillus sp* NRRL B-3699, *Bacillus sp* NRRL B-3700, *Candida lipolytica* ATCC 16617, *Candida lipolytica* ATCC 16618 or *Rhodotorula glutinis* NRRL Y-7220.

* * * * *